(12) United States Patent
Ivgi

(10) Patent No.: US 10,767,984 B2
(45) Date of Patent: Sep. 8, 2020

(54) METHOD FOR ASSEMBLING A PROJECTING APPARATUS

(71) Applicant: INUITIVE LTD., Ra'anana (IL)

(72) Inventor: Mishel Ivgi, Yehud-Monoson (IL)

(73) Assignee: INUITIVE LTD., Ra'Anana (IL)

( * ) Notice: Subject to any disclaimer, the term of this patent is extended or adjusted under 35 U.S.C. 154(b) by 33 days.

(21) Appl. No.: 16/266,315

(22) Filed: Feb. 4, 2019

(65) Prior Publication Data
US 2019/0242698 A1 Aug. 8, 2019

Related U.S. Application Data

(60) Provisional application No. 62/626,192, filed on Feb. 5, 2018.

(51) Int. Cl.
| | | |
|---|---|---|
| *G01B 5/00* | (2006.01) | |
| *G01B 11/25* | (2006.01) | |
| *G03B 21/00* | (2006.01) | |

(52) U.S. Cl.
CPC ........ *G01B 11/2545* (2013.01); *G01B 5/0004* (2013.01); *G01B 11/2513* (2013.01); *G03B 21/00* (2013.01)

(58) Field of Classification Search
CPC ............ G01B 11/2545; G01B 11/2513; G01B 5/0004; G03B 21/00; G03B 21/145
See application file for complete search history.

(56) References Cited

U.S. PATENT DOCUMENTS

| | | | | | |
|---|---|---|---|---|---|
| 5,450,373 | A | * | 9/1995 | Kupiszewski | ............ B06B 1/02 367/142 |
| 5,521,724 | A | * | 5/1996 | Shires | ...................... G02B 5/32 359/15 |
| 5,589,980 | A | * | 12/1996 | Bass | ...................... G02B 30/56 359/478 |
| 5,625,198 | A | * | 4/1997 | Chigira | ................ G05B 19/401 250/559.29 |
| 5,650,815 | A | * | 7/1997 | Dasso | .................. H04N 13/221 348/42 |
| 5,677,788 | A | * | 10/1997 | Chen | .................... H04N 9/3105 348/E9.027 |
| 5,734,416 | A | * | 3/1998 | Ito | ............................ H04N 9/31 345/58 |
| 5,774,254 | A | * | 6/1998 | Berlin | ................ G02B 26/0858 345/84 |
| 5,872,590 | A | * | 2/1999 | Aritake | .................. H04N 13/31 348/57 |
| 5,879,065 | A | * | 3/1999 | Shirochi | .............. H04N 9/3105 353/8 |

\* cited by examiner

*Primary Examiner* — Bayan Salone
(74) *Attorney, Agent, or Firm* — Browdy and Neimark, PLLC

(57) ABSTRACT

A method is provided for assembling a 3D sensing apparatus that comprises at least two projectors, wherein the assembling of the apparatus is carried out by ensuring that a pattern formed from a combination of images projected by each of the at least two projectors, is not formed along an epi-polar line or part thereof more than once. The method comprises the steps of: placing the at least two projectors at initial approximate physical positions within the 3D sensing apparatus; and, placing one or more projectors' protectors on top of the at least two projectors, thereby changing the projectors initial positions and automatically positioning them accurately in their pre-defined position and orientation by using the one or more projectors' protectors.

10 Claims, 2 Drawing Sheets

METHOD FOR ASSEMBLING A PROJECTING APPARATUS

TECHNICAL FIELD

The present disclosure generally relates to the field of optical projectors, and more particularly, to the field of assembly such projectors.

BACKGROUND

Some types of 3D sensing systems use active illumination, generated by pattern projecting modules. Among such systems there are systems that include light-coding and stereo 3D sensors, as well as hybrid systems combining both methods. However, for these types of 3D sensing systems, it is important that the pattern does not repeat itself along epi-polar lines, or at least is not repeated for part of the complete line. Yet, in some cases, the pattern projected by some modules is rather periodic.

In the known art, there are some solutions that propose solving the above problem by using a pair of projector modules, where their orientation is relative to position of the camera(s) used for 3D sensing, and is optimally determined so as to minimize pattern periodicity. In order to obtain that, a high accuracy is required in the module's rotation around the axis of sensing camera(s). In this solution, the angle accuracy is rather crucial in order to assure a non-repetitive pattern through the disparity range of the 3D sensor. Unfortunately, standard PCB assembly technologies implemented by the SMT ("Surface-Mount Technology) method, cannot guarantee the required accuracy.

The placement accuracy of standard printed circuit board (PCB) technologies cannot provide the required assembly precision of the projectors to allow good and consistent performance of the 3D sensors over large scale manufacturing. In many cases, when two projectors are required, the problem is not addressed by other means except of standard SMT assembly, which is a method for manufacturing electronic circuits in which the components are mounted or placed directly onto the surface of PCBs. The present invention seeks to provide a solution that overcomes this challenge.

SUMMARY OF THE DISCLOSURE

The disclosure may be summarized by referring to the appended claims.

It is an object of the present disclosure to provide a method for using a protecting element of a projector, an element which is normally used for safety reasons to keep the projector assembly intact. The protecting element is used in a process of placing the projectors accurately at their designated positions, which yields a placement precision of the projectors that is much higher than the precision that may be achieved while following a standard PCB assembly procedure.

It is another object of the present disclosure to provide a method for and a device wherein the protector/jig is used in the process of placing optical components according to their optical position rather than according to the shape of the pad associated therewith.

Other objects of the present invention will become apparent from the following description.

According to a first embodiment of the invention, there is provided a method for assembling a 3D sensing apparatus that comprises at least two projectors, wherein the assembling of the apparatus is carried out by ensuring that a pattern formed from a combination of images projected by each of the at least two projectors, is not formed along an epi-polar line or part thereof more than once, and wherein the method comprises the steps of:

placing the at least two projectors at initial approximate physical positions within the 3D sensing apparatus; and placing one or more projectors' protectors on top of the at least two projectors, thereby changing the projectors initial positions and automatically positioning them by the use of the one or more projectors' protectors accurately in their pre-defined position and orientation.

In accordance with another embodiment, the step of positioning the at least two projectors in their pre-defined position and orientation comprises positioning the at least two projectors in pre-defined positions and orientations which do not completely overlap shape of their respective pads used to mount said at least two projectors at the 3D sensing apparatus.

By yet another embodiment, the step of positioning the at least two projectors in pre-defined positions and orientations comprises positioning the at least two projectors in accordance with their optical position rather than according to their pad shape, thereby obtaining their alignment at the optical component level.

According to still another embodiment the achievable alignment accuracy obtainable by implementing said method is less than ±1.0°. Preferably, the achievable alignment accuracy is less than ±0.5°.

According to another embodiment, the final positioning of the at least two projectors is determined in accordance with the pre-defined orientation of the respective projectors' lens of the at least two projectors.

In accordance with another embodiment, the pre-defined orientation of the respective projectors' lens is derived from a pre-defined angle selected to avoid projecting the repeating pattern.

According to yet another embodiment, the method provided further comprising a step of applying a reflow process onto said apparatus, following the placement of the at least two projectors and the placement of the one or more projectors' protectors at their respective locations.

In accordance with another embodiment, the one or more projectors' protectors is made of a plastic material that can be subjected to temperatures developed during the reflow step without losing its shape nor its properties.

By still another embodiment, the at least two projectors are mounted each onto the apparatus by using two flexible positioning arms configured to push the at least two projectors against the top part of the respective projector, thereby positioning each respective projector at its pre-defined position and orientation.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

One of the underlying ideas of the present disclosure involves the use of the projector's protector on the one hand for keeping the projector assembly intact for safety purposes and on the other hand to use it in the process of placing the projectors accurately in their designed positions, with a precision that is much higher than may be achieved in a standard PCB assembly procedure, which typically can ensure a positioning accuracy of ~±3°.

Another aspect which may be achieved by employing the solution disclosed herein is the use of the protector/jig in the process of placing the components of the device according to their optical position rather than according to their pad shape. The term "protector" as used hereinafter is used to denote any member of a group that consists of a safety cover, a protector and a jig.

The projected pattern orientation may be determined by the optical components, which are positioned at the top of the projectors. In which case, aligning the projectors at the optical component level provides an assembly accuracy that is typically less than ±0.5°.

Figure 1:
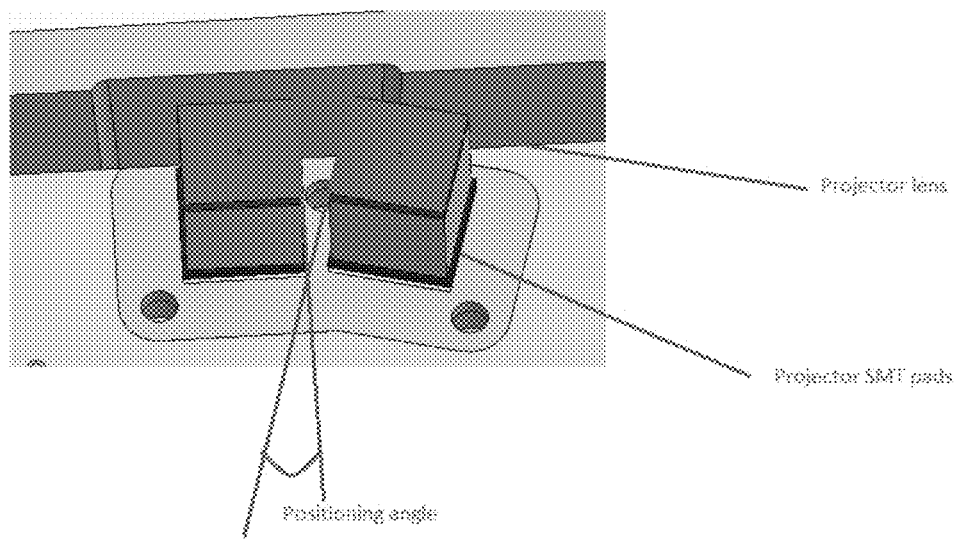
FIG. 1—illustrates an example of a dual projector assembly construed in accordance with an embodiment of the present invention.

FIG. 1 illustrates an example construed in accordance with an embodiment of the present disclosure, wherein two projectors are assembled in a device at a pre-defined angle which is selected to avoid projecting a repeating pattern. The projectors' positions are preferably controlled according to the respective projectors' lens as depicted in FIG. 1.

In a typical reflow assembly process of SMT parts, the projectors are assembled by a pick and place machine which places the parts over the PCB pads. This reflow soldering process is a process in which a soldering paste (a mixture of powdered solder and flux) is used to temporarily attach one or several electrical components to their contact pads, after which the entire assembly is subjected to controlled heat, which melts the soldering paste and permanently connecting the joint. However, this process is not accurate enough due to placement tolerances which are related to the accuracy of the placement machine and also to the parts' movements while the PCB undergoes the reflow process, as the components might move before located at their final place on the PCB, due to surface tension actions of the soldering paste being subjected to the controlled heat.

Due to the above limitations, the components may slightly rotate with respect to other components mounted on the PCB, and the with respect to the PCB itself. In addition, controlling the exact location of the SMT pads does not suffice to provide the required accuracy as the actual orientation of the pattern (for which the accuracy of the components placement is required) is in fact determined by the optical components themselves, rather than by the pads or the housing of the projector.

Unlike the prior art solution described above, the method provided by the present disclosure relies on modifying the safety cover (i.e. the protector) of the projector to enable accurate placement of the projectors, wherein the placement of the projectors is done prior to the beginning of the reflow process.

Figure 2:
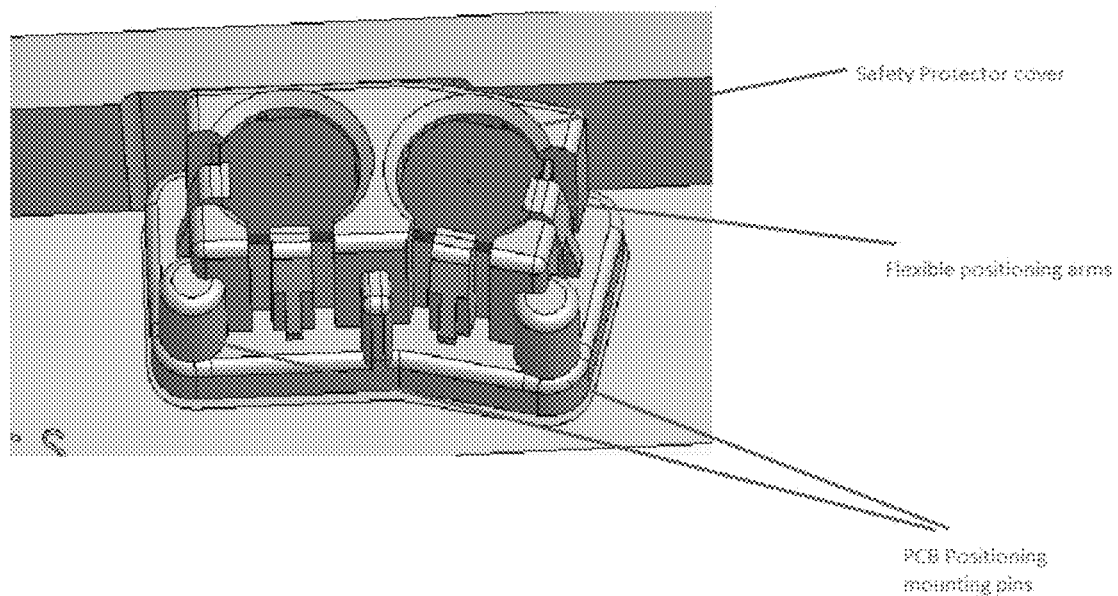
FIG. 2—illustrates an embodiment of the present disclosure of a projector assembly together with a mounting jig/protector.

FIG. 2 illustrates an assembled structure which comprises two projectors and the placed protector. The protector is mounted following the placement of the projectors by a placement machine, before applying the reflow process onto this structure. When the protector is placed all the way down to its final position, it will in turn cause the positioning of the projectors accurately with respect to the optical components of the projectors.

Figure 3:
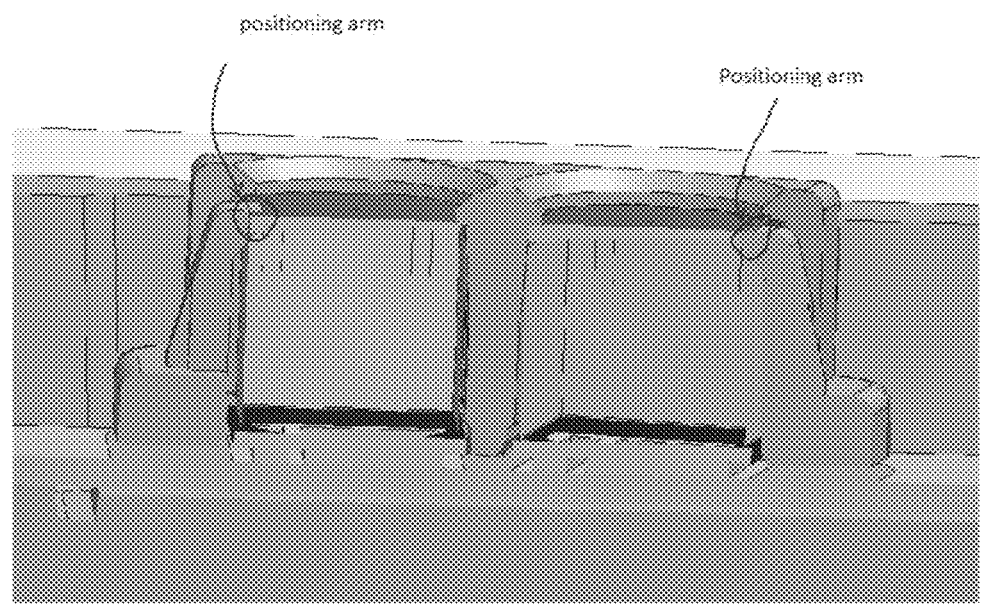
FIG. 3—demonstrates a cross section of the jig/protector illustrated in FIG. 2, where a pair of positioning arms is shown.

FIG. 3 demonstrates an example of implementing an embodiment by which two flexible positioning arms are used for positioning the projector, by pushing these two flexible positioning arms against the top part of the projector. In this example, the two arms push the projectors against an alignment corner located at the opposite side of the two flexible positioning arms.

Preferably, the protector is made of a plastic material which is characterized in that it can be subjected to the temperatures being developed during the reflow process, all without losing its shape and properties, and obviously without melting down.

In summary, the solution provided by the present invention offers, among others, a cheap and accurate mechanical solution to the problem of accurately placing optical components, which in turn enables controlling pattern orientation at the optical component level.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different objects, not all of which are required in all embodiments of the invention. Some embodiments of the present invention utilize only some of the objects or possible combinations of the objects. Variations of embodiments of the present invention that are described and embodiments of the present invention comprising different combinations of features noted in the described embodiments will occur to persons of the art. The scope of the invention is limited only by the following claims.

The invention claimed is:

1. A method for assembling a 3D sensing apparatus that comprises at least two projectors, wherein the assembling of the apparatus is carried out by ensuring that a pattern formed from a combination of images projected by each of the at least two projectors, is not formed along an epi-polar line or part thereof more than once, wherein the method comprising the step of:
   placing the at least two projectors at initial approximate physical positions within said 3D sensing apparatus; and
   placing one or more projectors' protectors on top of the at least two projectors, thereby changing the projectors initial positions and automatically positioning them accurately in their pre-defined position and orientation by using the one or more projectors' protectors.

2. The method of claim 1, wherein the step of positioning the at least two projectors at their pre-defined position and orientation, comprises positioning the at least two projectors at their pre-defined position and orientation which do not completely overlap shape of their respective pads that are used to mount said at least two projectors at said 3D sensing apparatus.

3. The method of claim 2, wherein the step of positioning the at least two projectors in their pre-defined position and orientation comprises positioning the at least two projectors in accordance with optical position rather than according to their pad shape, thereby obtaining their alignment at the optical component level.

4. The method of claim 1, wherein the alignment accuracy obtained by implementing said method is less than ±1.0°.

5. The method of claim 4, wherein the obtained alignment accuracy is less than ±0.5°.

6. The method of claim 1, wherein the final positioning of the at least two projectors are determined in accordance with pre-defined orientation of the respective projectors' lens of the at least two projectors.

7. The method of claim 1, wherein the pre-defined orientation of the respective projectors' lens is derived from a pre-defined angle selected to avoid projecting a repeating pattern.

8. The method of claim 1, further comprising a step of applying a reflow process onto said apparatus, following the placement of the at least two projectors and the placement of the one or more projectors' protectors at their respective locations.

9. The method of claim 1, wherein said at least two projectors are mounted each onto the apparatus by using two flexible positioning arms configured to push the at least two projectors against the top part of the respective protector, thereby positioning the respective projector at its pre-defined position and orientation.

10. The method of claim 8, wherein said one or more projectors' protectors is made of a plastic material that can be subjected to temperatures developed during the reflow step without losing its shape and properties.

* * * * *